United States Patent
Shankar et al.

(10) Patent No.: US 9,819,412 B1
(45) Date of Patent: Nov. 14, 2017

(54) TRANSMITTER GAIN IMBALANCE AND SKEW OPTIMIZATION FOR COHERENT TRANSMITTERS

(71) Applicant: INPHI CORPORATION, Santa Clara, CA (US)

(72) Inventors: Hari Shankar, Santa Clara, CA (US); Ariel Nachum, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/146,815

(22) Filed: May 4, 2016

(51) Int. Cl.
*H04B 10/00* (2013.01)
*H04B 10/077* (2013.01)
*H04B 10/58* (2013.01)

(52) U.S. Cl.
CPC ......... *H04B 10/0775* (2013.01); *H04B 10/58* (2013.01)

(58) Field of Classification Search
CPC ............................ H04B 10/0775; H04B 10/58
USPC ........................................................ 398/192
See application file for complete search history.

(56) References Cited

U.S. PATENT DOCUMENTS

| | | | | |
|---|---|---|---|---|
| 5,161,044 A * | 11/1992 | Nazarathy | ................ | H04B 1/62 398/194 |
| 5,526,158 A * | 6/1996 | Lembo | .................. | H04B 10/64 398/183 |
| 6,566,948 B1 * | 5/2003 | Braithwaite | .......... | H03F 1/3247 330/136 |
| 9,124,364 B1 * | 9/2015 | Sotoodeh | ......... | H04B 10/50577 |
| 2002/0191713 A1 * | 12/2002 | McVey | .................... | H03C 3/40 375/308 |
| 2003/0175037 A1 * | 9/2003 | Kimmitt | ............... | G02F 1/0123 398/198 |
| 2004/0208635 A1 * | 10/2004 | Sinsky | ................. | H04B 10/505 398/183 |
| 2009/0233562 A1 * | 9/2009 | Kim | ....................... | H04B 17/14 455/115.1 |
| 2011/0222850 A1 * | 9/2011 | Roberts | ................ | H04B 10/532 398/38 |

OTHER PUBLICATIONS

Gang Yang et al., "An Algorithm for Quantitatively Calculating I/Q Gain and Phase Mismatch", TELKOMNIKA, Aug. 2, 2012, pp. 812-817, vol. 10, No. 4, Universitas Ahmad Dahlan.

Eamon Nash, "Correcting Imperfections in IQ Modulators to Improve RF Signal Fidelity", AN-1039 Application Note, 2009, pp. 1-8, Analog Devices.

* cited by examiner

*Primary Examiner* — Juan A Torres
(74) *Attorney, Agent, or Firm* — Richard T. Ogawa; Ogawa P.C.

(57) ABSTRACT

The present invention is directed to communication systems and techniques thereof. More specifically, embodiments of the present invention provide a calibration system for optical transmitter. The calibration system provides a predetermined set of operating parameters to the optical transmitter and measures the second harmonic value of the transmitter output. A calibrated set of parameters is determined by selecting operating parameters associated with the minimum second harmonic value. There are other embodiments as well.

20 Claims, 12 Drawing Sheets

TRANSMITTER GAIN IMBALANCE AND SKEW OPTIMIZATION FOR COHERENT TRANSMITTERS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to communication systems and techniques thereof.

Over the last few decades, the use of communication networks exploded. In the early days of the Internet, popular applications were limited to emails, bulletin boards, and mostly informational and text-based web page surfing, and the amount of data transferred was relatively small. Today, Internet and mobile applications demand a huge amount of bandwidth for transferring photos, videos, music, and other multimedia files. For example, a social network like Facebook processes more than 500 TB of data daily. With such high demands on data and data transfer, existing data communication systems need to be improved to address these needs. For example, for transmitting a large amount of data, coherent optical systems that utilize high order modulation schemes like 16QAM and 64QAM are being used to satisfy the ever increasing bandwidth demand.

To achieve these high level constellations at high baud rates, imperfections in the transmitter high speed path need to be measured accurately and compensated for, as needed. Gain imbalance and skew between the different coherent transmitter channels are two such impairments. Different techniques exist to compensate for those two particular impairments; some require expensive equipment and long measurement times. Embodiments of the present invention offer simple, fast and sensitive techniques that use relatively inexpensive instruments that are found in many labs and production facilities.

BRIEF SUMMARY OF THE INVENTION

The present invention is directed to communication systems and techniques thereof. More specifically, embodiments of the present invention provide a calibration and optimization system for optical transmitter. The calibration system provides a predetermined set of operating parameters to the optical transmitter and measures the second harmonic value of the transmitter output. A calibrated set of parameters is determined by selecting operating parameters associated with the minimum second harmonic value. There are other embodiments as well.

According to an embodiment, the present invention provides a system for calibrating an optical transmitter. The system includes a photodetector coupled to the optical transmitter. The photodetector generates an electrical signal using an optical signal received from the optical transmitter. The system also includes a spectrum analyzer coupled to the photodetector. The spectrum analyzer is configured to determine a second harmonic value for the electrical signal received from the photodetector. The system additionally includes a controller module and a DAC that are configured to provide test signals and transmitter parameters to the optical transmitter and process the second harmonic value determined by the spectrum analyzer. The controller and DAC generate predetermined sets of transmitter parameters to the optical transmitter and determine a set of calibrated parameters based on a set of transmitter parameters associated with a minimum second harmonic value.

According to another embodiment, the present invention provides a system for calibrating an optical transmitter. The system includes a photodetector coupled to the optical transmitter. The photodetector generates an electrical signal using an optical signal received from the optical transmitter. The system also includes a spectrum analyzer coupled to the photodetector. The spectrum analyzer is configured to determine a second harmonic value for the electrical signal received from the photodetector. The system additionally includes a controller module being configured to provide testing signals and transmitter parameters to the optical transmitter and process the second harmonic value determined by the spectrum analyzer. The controller generates predetermined sets of transmitter parameters to the optical transmitter and determines a set of calibrated parameters based on a set of transmitter parameters associated with a minimum second harmonic value. The set of calibrated parameters comprises a gain parameter and a skew parameter. The set of calibrated parameters is stored by the controller of the optical transmitter.

According to yet another embodiment, the present invention provides a method for calibrating transmitter parameters. The method includes coupling an optical transmitter to a calibration system. The optical system includes a photodetector, a spectrum analyzer, and a controller. The method also includes retrieving a set of calibration parameter from the controller. The calibration parameter includes a set of initial parameters. The method additionally includes providing the set of initial parameters to the optical transmitter. The method further includes generating an initial optical signal by the optical transmitter based on the set of initial parameters. The method additionally includes converting the initial optical signal to an initial electrical signal using the photodetector. The method also includes determining a second harmonic value based on the initial electrical signal using the spectrum analyzer. The method further includes generating calibrated optical signals using the set of calibration parameters by the optical transmitter. The method also includes determining a set of calibrated parameters from the set of calibration parameters based on a minimum second harmonic value. The method further includes storing the set of calibrated parameters by the controller of the optical transmitter.

It is to be appreciated that embodiments of the present invention provide many advantages over conventional techniques. Among other things, by using the second harmonic value of the transmitter output as a calibration metric, a calibration system with a readily available spectrum analyzer can be inexpensively implemented, and the system can optimize transmitter settings efficiently. In addition, embodiments of the present invention can be implemented in conjunction with existing systems and processes. For example, existing optical transmitters can be calibrated using calibration systems according to embodiments of the present invention. There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
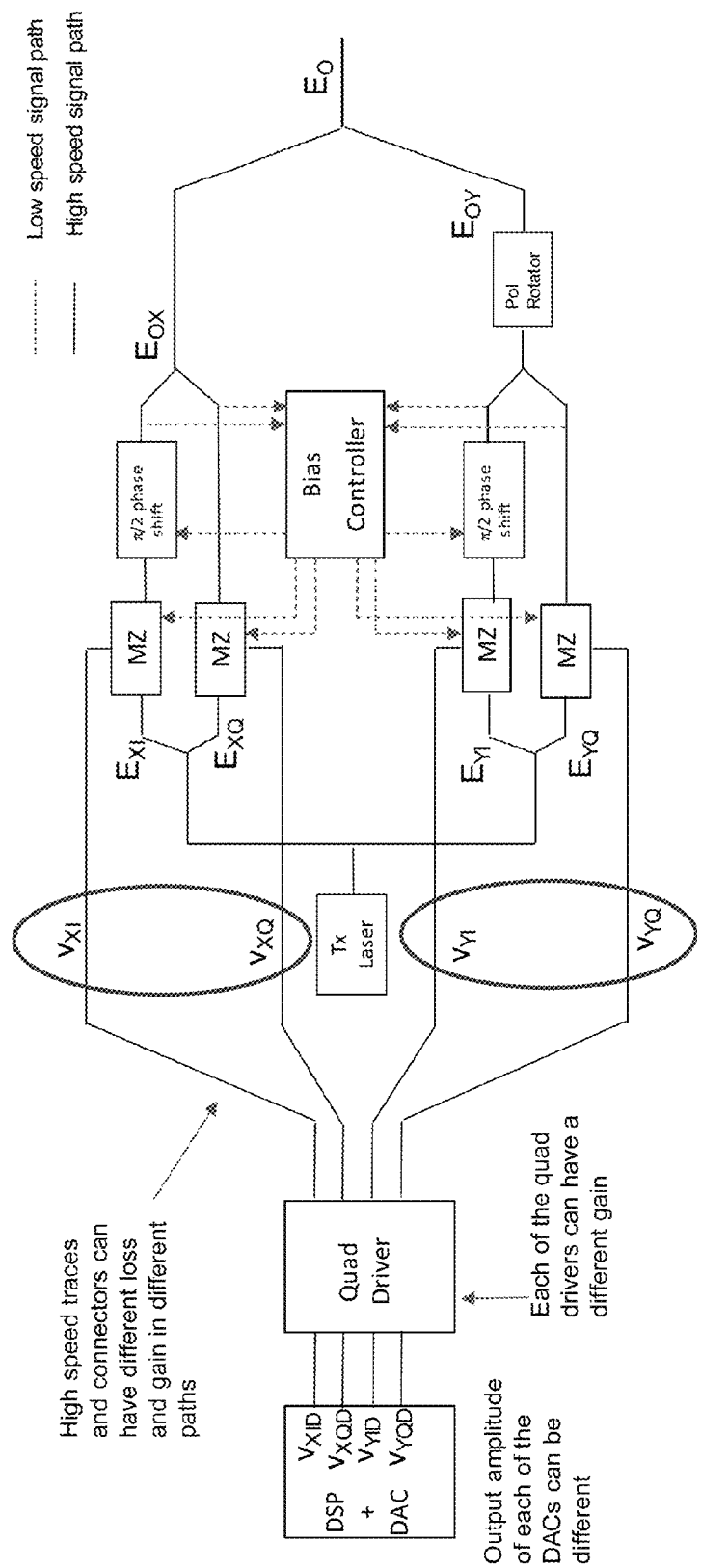
FIG. 1 is a simplified diagram illustrating an exemplary coherent transmitter.

The present invention is directed to communication systems and techniques thereof. More specifically, embodiments of the present invention provide a calibration system for optical transmitter. The calibration system provides a predetermined set of operating parameters to the optical transmitter and measures the second harmonic value of the transmitter output. A calibrated set of parameters is determined by selecting operating parameters associated with the minimum second harmonic value. There are other embodiments as well.

A high level of accuracy is required compared with conventional methods. More specifically, to achieve high level constellations (e.g., 16QAM and 64QAM) at high baud rates, imperfections in the transmitter high speed path need to be measured to a high level of accuracy and compensated for. Often, the compensation process involves expensive equipment and long measurement time. For example, specialized equipment is often used to measure gain imbalance and skew between the in-phase and quadrature channels of a coherent transmitter. It is thus to be appreciated that embodiments of the present invention provide methods and system for determining and calibrating gain and skew characteristics of coherent transmitters.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram forms, rather than in details, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

As mentioned above, embodiments of the present invention provide systems and methods for measuring various parameters (e.g., gain imbalance and skew) that can be used to calibrate a transmission system. More specifically, gain imbalance and skew between the I (in-phase) and Q (quadrature) channels of the transmitter, from the DAC to the optical output of the transmitter, are measured using a spectrum analyzer. It is to be appreciated that spectrum analyzers are relatively inexpensive instruments, and thus techniques according to the present invention can be easily implemented in existing lab environments for device testing and characterization, which allows for device adjustments during production testing.

In an exemplary coherent transmitter, a laser generates a light signal that is split into two polarization components in a Mach-Zehnder (MZ) modulator: the horizontal (X-polarization) and the vertical (Y-polarization). On each polarization, there are in-phase (I) and quadrature (Q) channels. Each channel accepts high-speed data from one of the DAC outputs, after processing by the respective digital signal processor (DSP), via a modulator driver that amplifies the low-level signals to the signal levels required by the modulators. Impairments (e.g., gain imbalance, skew, etc.) along this high speed-path affect the overall quality of the transmitted signal.

Many mechanisms degrade practical coherent transmitters. For example, a source of signal degradation is the skew and gain imbalance between the horizontal in-phase (XI) and horizontal quadrature (XQ) high-speed paths (and also between vertical in-phase YI and quadrature YQ). The elements in these high-speed data paths, which include the DAC, the drivers, the MZ modulators, traces, and connectors, contribute to the signal degradation. It is also to be noted that at the MZ modulator, the splitter may not divide the optical power equally between the I and Q paths. Also, the voltage $V_\pi$ which is needed to induce a phase change for the in-phase and quadrature modulators, may be unequal.

FIG. 1 is a simplified diagram illustrating an exemplary coherent transmitter. This diagram is merely an example, which should not unduly limit the scope of the claims. One of ordinary skill in the art would recognize many variations, alternatives, and modifications. The light coming from the Tx laser source is modulated by the analog signals (i.e., $v_{XI}$, $v_{XQ}$, $v_{YI}$, and $v_{YQ}$) that drive the dual phase optical IQ modulators. The combined optical output signal, $E_O$, is the output. Inputs (i.e., $E_{XI}$, $E_{XQ}$, $E_{YI}$, and $E_{YQ}$) comprise the optical inputs from the laser to the four modulators. For example, each of the drivers can provide a different gain. Outputs $E_{OX}$ and $E_{OY}$ are the modulated optical outputs in the X and Y polarizations. The bias controller shown in FIG. 1 sets and maintains the desired operating point of the modulator.

As an example, output $E_{OX}$ can be expressed by Equation 1 below:

$$E_{OX} = E_{XI}\sin\left(\frac{\pi v_{XI}(t)}{V_{\pi\_XI}} + \theta_{BXI}\right)\cos(\omega_0 t) - E_{XQ}\sin\left(\frac{\pi v_{XQ}(t-\tau)}{V_{\pi\_XQ}} + \theta_{BXQ}\right)\sin(\omega_0 t + \phi_X)$$

In Equation 1, $\theta_{BXI}$ and $\theta_{BXQ}$ are values associated with MZ bias that is controlled by the bias controller (see FIG. 1). The term $\phi_X$ is the quadrature offset value that is also controlled by the bias controller. The MZ bias point and quadrature offset, which set the operating point of the modulator, are determined by control loops using a low frequency signal that is not in the high speed signal path.
Ideally:

$E_{XI}=E_{XQ}=E$ $V_{\pi\_XI}=V_{\pi\_XQ}=V_\pi$ $\theta_{BXI}=\theta_{BXQ}=0$ $\phi_X=0$ $\tau=0$ By applying the terms above into Equation 1, Equation 1 is simplified into Equation 2 below:

$$E_{OX,Ideal} = E\sin\left(\frac{\pi v_{XI}(t)}{V_\pi}\right)\cos(\omega_0 t) - E\sin\left(\frac{\pi v_{XQ}(t)}{V_\pi}\right)\sin(\omega_0 t)$$

However, in a practical system, various parameters (e.g., $E_{XI}$, $E_{XQ}$, $\theta_{BX}$, etc.) need to be adjusted to obtain as close to ideal performance as described in Equation 2. For example, the bias controller can optimize $\theta_{BXI}$, $\theta_{BXQ}$, and $\phi_X$. Yet, $E_{XI}$, $E_{XQ}$, $V_{\pi\_XI}$, $V_{\pi\_XQ}$, $\tau$, and the amplitudes of $v_{XI}(t)$ and $v_{XQ}(t)$, which are independent of the bias setting and need to be optimized or compensated for. According to various embodiments of the present invention, the optical output of the transmitter is measured, and the measurement of the output is used to determine the overall gain imbalance and skew in the high-speed data path. For example, second harmonic value of the optical output is used for calibrating gain and phase offset parameters according to embodiments of the present invention. As explained above, gain imbalance and skew can be attributed to various factors, such as imperfections in the DAC, driver, traces, connectors, modulator, or combination thereof.

Figure 2:
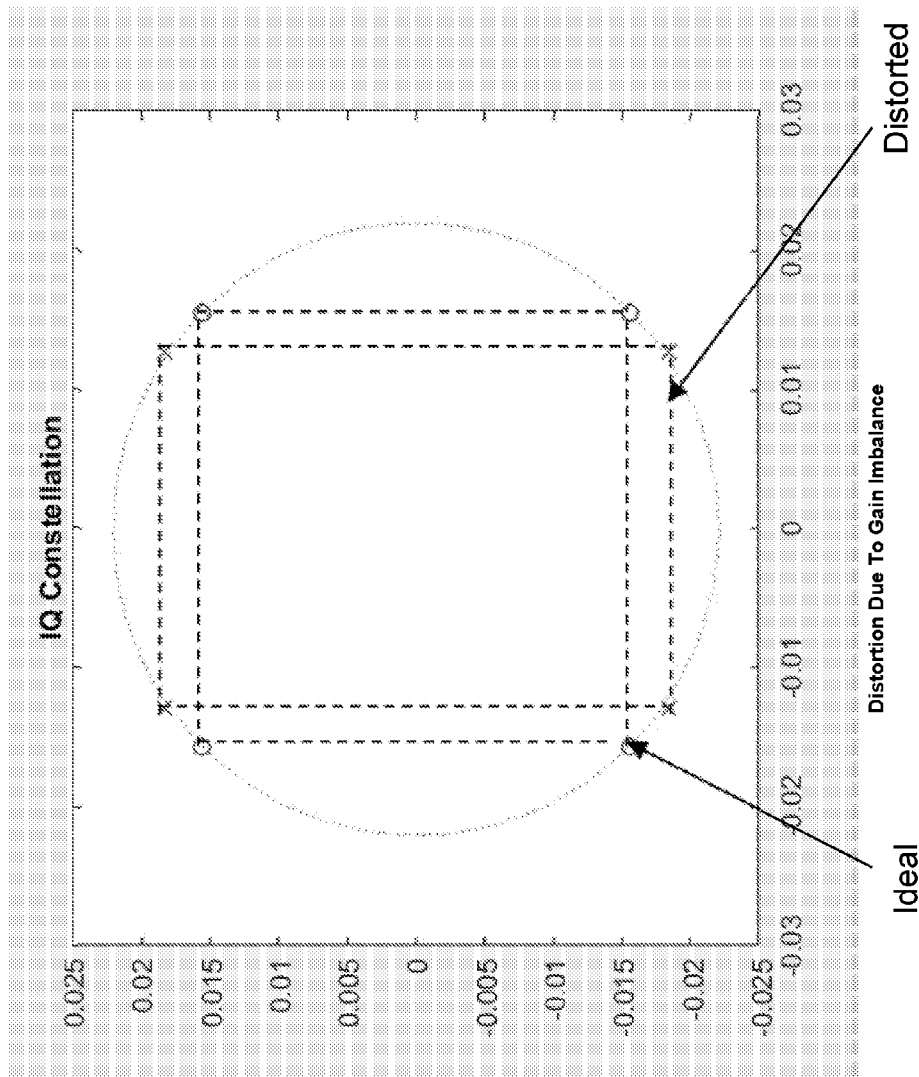
FIG. 2 is a simplified diagram illustrating gain imbalance in an I/Q constellation.
Figure 3:
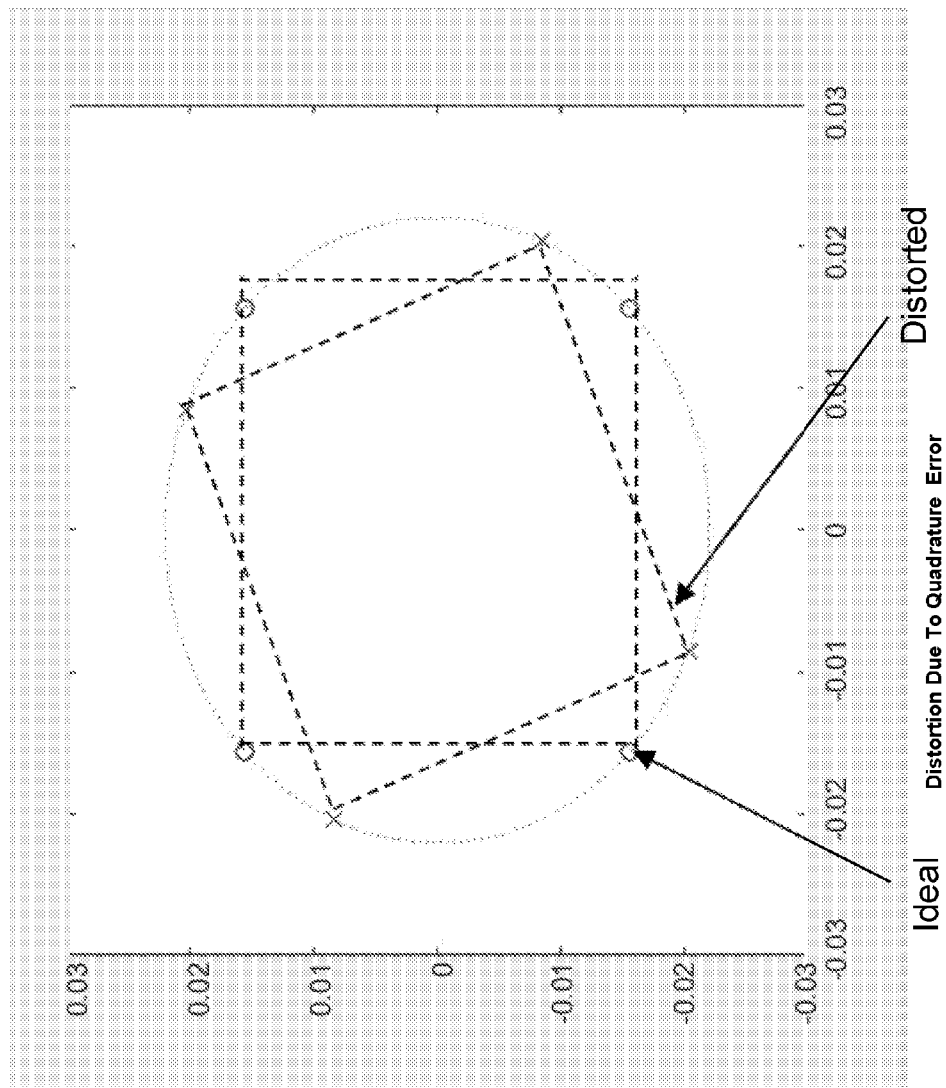
FIG. 3 is a simplified diagram illustrating quadrature error in an I/Q constellation.

For coherent optical transmitters, the gain parameter of the in-phase path can be different from the gain parameter of the quadrature path, and this difference can be attributed to factors such as DAC or the driver gain mismatch, insertion loss, gain mismatch inside the modulator, and/or other factors. Regardless of the causes, the shape of the constellation is distorted, which means degraded signal integrity. As an example, FIG. 2 is a simplified diagram illustrating gain imbalance in an I/Q constellation. FIG. 3 is a simplified diagram illustrating quadrature error in an I/Q constellation.

In the past, coherent receivers have been implemented, in addition to demodulating the signal, to estimate the gain imbalance and skew in the high-speed signal paths. Unfortunately, using coherent receivers to determine gain imbalance and skew is expensive, and measurement by a receiver would include receiver imperfections. Moreover, since coherent receivers measure incoming signals, the measurement is dependent on the bias settings of the modulator. Additionally, conventional techniques typically do not measure gain imbalance and skew as functions of frequency; instead, they only measure a single value.

It is to be appreciated that embodiments of the present invention provide a technique for determining calibration parameters for optical transmitters. More specifically, embodiments of the present invention provide a method that can measure the IQ gain imbalance and skew as a function of frequency, and the measurement process is independent of the modulator bias setting to first order (i.e., not sensitive to small errors in the modulator bias). For example, skew is adjusted using a phase offset parameter.

Figure 4:
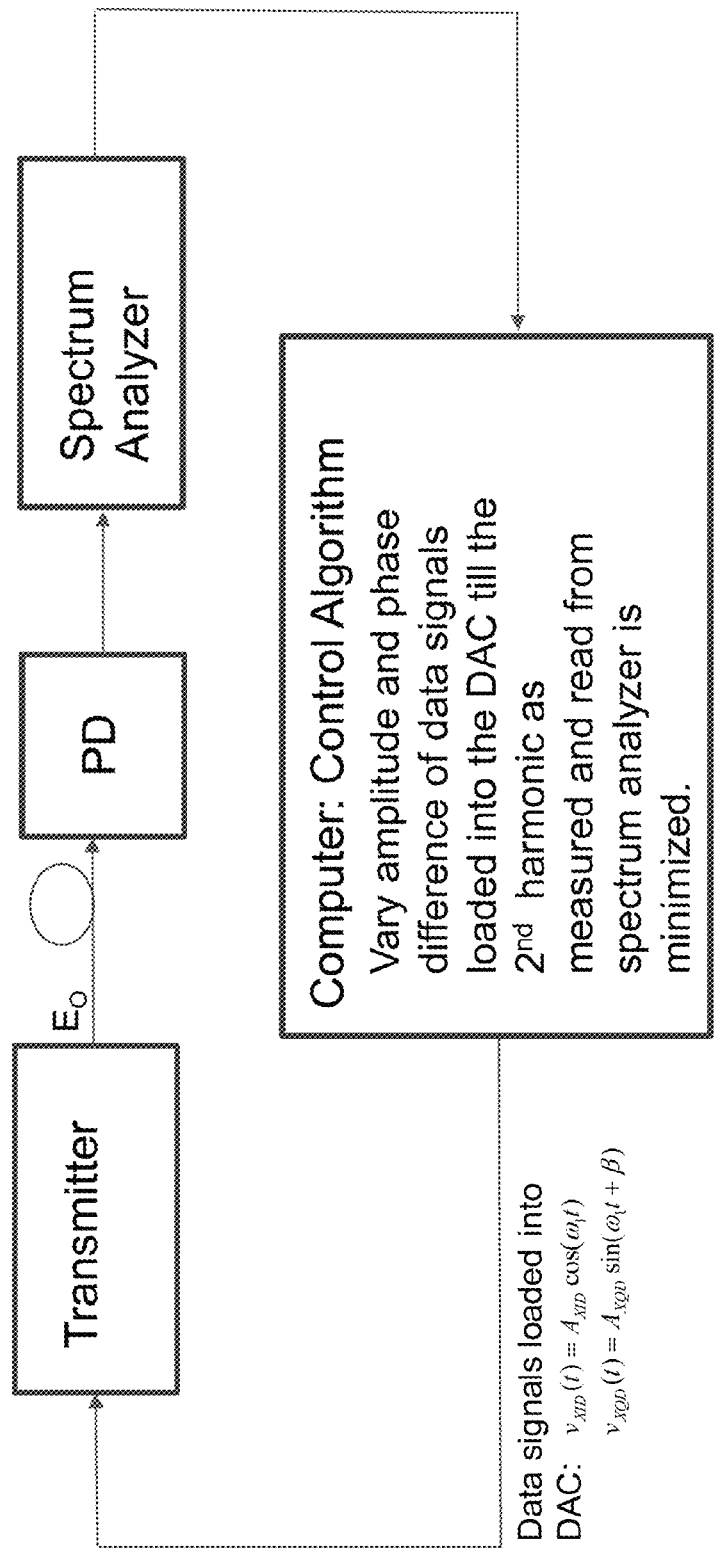
FIG. 4 is a simplified diagram illustrating a system for calibrating an optical transmitter according to an embodiment of the present invention.

FIG. 4 is a simplified diagram illustrating a system for calibrating an optical transmitter according to an embodiment of the present invention. This diagram is merely an example, which should not unduly limit the scope of the claims. One of ordinary skill in the art would recognize many variations, alternatives, and modifications. As shown in FIG. 4, optical output $E_O$ is converted by a photodiode (PD) into an electrical signal that is measured by the spectrum analyzer. A computer or controller (e.g., implemented as a part of the testing equipment) is used to vary various parameters (e.g., amplitude and phase differences of the data signals) of the transmitter based on the transmitter output measured by the spectrum analyzer. More specifically, the computer sends data signal into the transmitter DAC and monitors the transmitter output as measured by the spectrum analyzer. The computer varies amplitude and phase difference of the data signal that is loaded into the DAC until the second harmonic of the transmitter output as measured by the spectrum analyzer is minimized. For example, the signal loaded into the DAC is given as:

$v_{XID}(t) = A_{XID}\cos(\omega_1 t)$ $v_{XQD}(t) = A_{XQD}\sin(\omega_1 t + \beta)$ It is to be appreciated that the computer device as illustrated in FIG. 4 can be implemented in various forms. For example, the computer providing control algorithm may be implemented as a calibration device that is used in a manufacturing facility for optical transmitter devices. According to various embodiments, a calibration system includes, among other things, photodetector, spectrum analyzer, and a control module (e.g., a computer). A transmitter that needs calibration is plugged into the calibration system to determine the optimal parameters that are to be used when operating the transmitter. For each transmitter that is being calibrated, the computer adjusts operating parameters (e.g., gain, phase offset, etc.) of the transmitter until the reading at the spectrum analyzer shows a minimized second harmonic. The operating parameters associated with the minimized second harmonic are stored at the transmitter as the optimal transmitter setting. For example, the transmitter setting is associated with various physical characteristics of transmitter components and specific to each of the transmitters. By determining and storing the optimal settings, transmitters can operate at an improved performance level after calibration performed by the calibration system illustrated in FIG. 4. Explanation of using the second harmonic for calibration is described in detail below.

As an example, for the following electrical signals at the MZ (e.g., data signal set by the computer and sent by the DAC of the transmitter) expressed by the equations below:

$V_{XI}(t) = A_{XI}\cos(\omega_1 t)$ $V_{XQ}(t) = A_{XQ}\sin(\omega_1(t-\tau) + \beta)$ The amplitudes of the electrical signals $V_{XI}(t)$ and $V_{XQ}(t)$ are functions of amplitude and gain values of the XI and XQ paths from the DAC to the modulator. Amplitudes at XI and XQ paths are expressed by the following equations, where $G_{XI}$ and $G_{XQ}$ are frequency dependent gains in the XI and XQ paths, and $\tau$ is the skew:

$A_{XI} = A_{XID}G_{XI}$ $A_{XQ} = A_{XQD}G_{XQ}$

Output $E_o$ is described by the equation below, where the optical carrier frequency is expressed as $\sin(\omega_0 t + \phi_X)$:

$$E_o = E_{XI}\sin\left(\frac{\pi A_{XI}}{V_{\pi XI}}\cos(\omega_1 t) + \theta_{BXI}\right)\cos(\omega_0 t) - E_{XQ}\sin\left(\frac{\pi A_{XQ}}{V_{\pi XQ}}\sin(\omega_1(t-\tau) + \beta) + \theta_{BXQ}\right)\sin(\omega_0 t + \phi_X)$$

To simplify the algebra we define:

$B_{XI} = \frac{\pi A_{XI}}{V_{\pi XI}}$ $B_{XQ} = \frac{\pi A_{XQ}}{V_{\pi XQ}}$ For the purpose of measuring transmitter output, the optical signal is converted to electrical signal by a photodetector, which allows for measurement by a spectrum analyzer. The electrical signal $P_o$ can be expressed by the following equation:

$$P_o = \frac{E_{XI}^2}{4}(1 - \cos(2B_{XI}\cos(\omega_1 t) + 2\theta_{BXI})) + \frac{E_{XQ}^2}{4}(1 - \cos(2B_{XQ}\sin(\omega_1(t-\tau) + \beta) + 2\theta_{BXQ})) - E_{XI}E_{XQ}\sin(B_{XI}\cos(\omega_1 t) + \theta_{BXI})\sin(B_{XQ}\sin(\omega_1(t-\tau) + \beta) + \theta_{BXQ})\sin(\phi_X)$$

Using Bessel functions, wherein the $J_n(\ )$ term is $n^{th}$ order Bessel functions of the first kind, the following equations are used to express the electrical signal $P_o$:

$$e^{iz\cos(\omega t)} = \sum_{n=-\infty}^{\infty} i^n J_n(z) e^{in\cos(\omega t)}$$

$$P_o = \frac{E_{XI}^2}{4}(1 - J_0(2B_{XI})) + \frac{E_{XQ}^2}{4}(1 - J_0(2B_{XQ})) + \frac{E_{XI}^2}{2}J_2(2B_{XI})\cos(2\omega_1 t) - \frac{E_{XQ}^2}{2}J_2(2B_{XQ})\cos(2\omega_1(t-\tau) + 2\beta) +$$

... ("bias controller dependent terms + higher order terms")

The second harmonic components in the above equation are independent of MZ bias, and the second harmonic components are expressed by the following term:

$$\frac{E_{XI}^2}{2}J_2(2B_{XI})\cos(2\omega_1 t) - \frac{E_{XQ}^2}{2}J_2(2B_{XQ})\cos(2\omega_1(t-\tau) + 2\beta)$$

The bias controller dependent terms in the equation are a function of the MZ bias controller settings and in ideal operating conditions will be small and therefore negligible. The higher order terms, are not used in this procedure.

As the above equations show, the main terms in the PD output equation, which are independent of the bias controller, are a DC signal and a tone corresponding to the second harmonic of the input sinusoid, where the fundamental depends upon the accuracy of the bias controller and ideally would be zero. More specifically, to eliminate the second harmonic terms, the following conditions are to be satisfied:

$\beta = \omega_1 \tau$ $$E_{XI}^2 J_2\left(\frac{2\pi A_{XID} G_{XI}}{V_{\pi XI}}\right) = E_{XQ}^2 J_2\left(\frac{2\pi A_{XQD} G_{XQ}}{V_{\pi XQ}}\right)$$

And for a small voltage swing, the following equation is used:

$$J_2(z) = \frac{z^2}{8} + O(z^3)$$

By subjecting a transmitter to conditions or settings that minimize the second harmonic of its output, one can compensate for imperfections in the transmitter. An imbalanced swing of the electric signal at the MZ modulator compensates for imbalances in the MZ itself. For example, imbalances include differences between $V_\pi$ of the I and Q modulators, and imbalances in the optical splitter resulting in unequal optical powers in the I and Q channels. The relationship between the output amplitude of the DAC and the transmitter output can be expressed using the equation below:

$$\frac{G_{XI}A_{XID}}{G_{XQ}A_{XQD}} = \frac{E_{XQ}V_{\pi\_XI}}{E_{XI}V_{\pi\_XQ}}$$

The equation provides a good illustration of relationship between the DAC voltage and the modulated signal, and it shows that if $V_\pi$ decreases, the amplitude of the drive signal also decreases; if the optical power increases, then the drive voltage decreases.

To measure gain imbalance and skew of a transmitter, the transmitter is connected to a calibration system (e.g., calibration system illustrated in FIG. 4). The controller or computer provides data signal to the DAC of the transmitter. For example, the data signal may be a predetermined sine wave function that is specifically configured for performing calibration. In addition, as a part of the calibration process, the computer may additionally set driver gain, phase offset, and/or other settings for the transmitter. The output of the transmitter, which is based on the input provided by the computer, is measured by a spectrum analyzer. The computer reads the output from the spectrum analyzer and adjusts the DAC output signal accordingly, thereby forming a feedback loop for calibration. The computer sets the transmitter (e.g., DSP module of the transmitter) to generate sinusoids at quadrature on the in-phase and quadrature channels of one of the polarizations, while setting the in-phase and quadrature signals of the other polarization to zero. Meanwhile, the calibration system monitors the MZ output of the transmitter via a PD using a spectrum analyzer. Based on the output of transmitter measured by the spectrum analyzer, the computer adjusts the gain of the driver on one of the channels (or the output swing of the DAC) until the amplitude of the $2^{nd}$ harmonic, as measured by the spectrum analyzer, is minimized. The computer also varies the phase offset between the I and Q sinusoids till the $2^{nd}$ harmonic is minimized (e.g., if the phase offset from quadrature is $\beta$ and the frequency is $\omega_1$, then the skew $\tau=\beta/2\omega_1$). It is to be understood that varying amplitude and phase offset can be performed as two separate processes, and sequence in which they are performed may be determined according to specific implementation.

Figure 5:
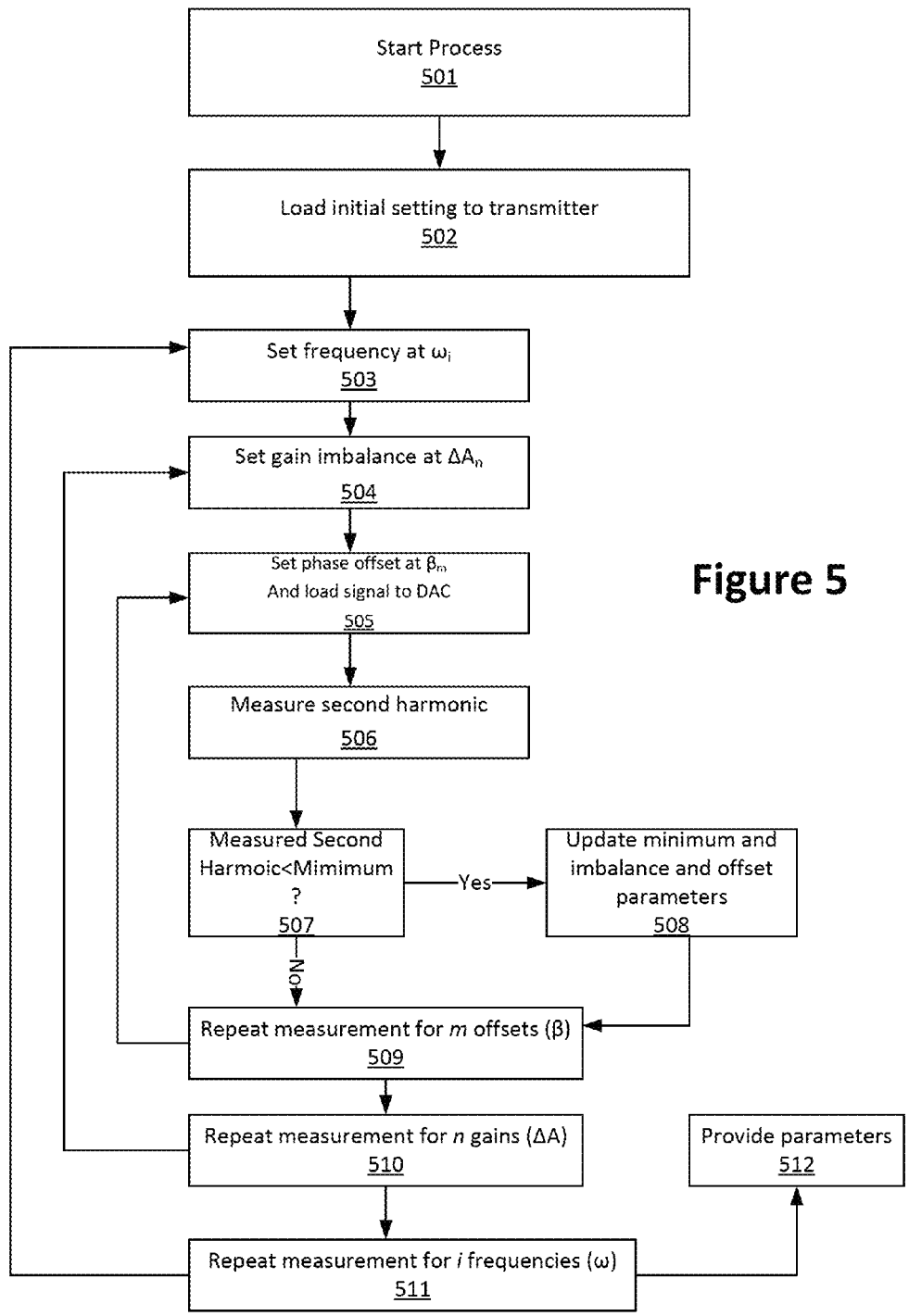
FIG. 5 is simplified flow diagram illustrating a process for transmitter calibration according to an embodiment of the present invention.

FIG. 5 is simplified flow diagram illustrating a process for transmitter calibration according to an embodiment of the present invention. This diagram is merely an example, which should not unduly limit the scope of the claims. One of ordinary skill in the art would recognize many variations, alternatives, and modifications. For example, one or more steps may be added, removed, repeated, rearranged, replaced, modified, and/or overlapped, which should not limit the scope of the claims. As an example, the process illustrated in FIG. 5 can be performed by the calibration system illustrated in FIG. 4, but it is understood that the process can performed by other types of calibration systems according to embodiments of the present invention. For example, an exemplary calibration system according to the present invention may be implemented as an integral part of a transmitter fabrication system. Depending on the specific implementation and constraints, alternative calibrations process can be used as well.

Below is an exemplary pseudo-code associated with FIG. 5:

Initialize: Range of frequencies for $\omega_1=[\omega_2, \omega_3, \ldots \omega_i]$ Range of gain imbalances $\Delta A=[\Delta A_1, \ldots, \Delta A_n]$
Range of phase offsets $\beta=[\beta_1, \ldots \beta_m]$
for $\omega_1$ over Range of frequencies {
$P_{2ndHarmonicMinimum}=-\infty$
for $\Delta A$ over Range of gain imbalances {
for $\beta$ over range of phase offsets $\beta$
Load DAC voltages $v_{XID}(t)=A_0 \cos(\omega_1 t)$ $v_{XQD}(t)=(A_0+\Delta A)\sin(\omega_1 t+\beta)$ Measure $P_{2ndHarmonic}$
if $P_{2ndHarmonic}<P_{2ndHarmonicMinimum}${
$P_{2ndHarmonicMinimum}=P_{2ndHarmonic}$
$\Delta A(\omega_1)=\Delta A$
$\beta(\omega_1)=\beta$
}
}
}
}

As the pseudo code shows, the number of measurements is i*n*m, where i is the number of frequencies, n is the number of amplitude settings, and m is the number of phase offsets. In various embodiments, parameters i, n, and m are predetermined based on the operating conditions of the transmitter. For example, the range of frequencies (e.g., from 1 GHz to 10 GHz) and the number of frequencies to perform calibration can be based on the actual operating frequency range of the transmitter. The different amplitude settings may be centered on a default amplitude setting value. For example, for a default amplitude setting (e.g., 250 mV), n amplitude settings less than and greater than the default settings are tried (e.g., from 180 mV to 320 mV with n steps). Similarly, the m phase offset sets may be centered on a default phase offset value. For example, for a default offset (e.g., 90 degrees), m phase offset parameters both less than and greater than the default offset are tried (e.g., from 85 degrees to 95 degrees with m steps). After measuring transmitter output for i*n*m iterations, a minimum second harmonic value and its associated gain imbalance parameter $\Delta A$ and phase offset parameter $\beta$ are determined, which can then be used as the calibrated operating parameter of the transmitter.

The process starts at step 501. For example, a calibration system starts when a transmitter (e.g., a newly manufactured transmitter or any transmitter) is coupled to the calibration system for calibration. For example, the optical output of the transmitter is coupled to a photodetector, which converts optical signal received from the transmitter to an electrical signal to be measured by a spectrum analyzer. Additionally, the calibration system is coupled to the transmitter to provide data and control signals for the calibration process, and a data communication link between the transmitter and the calibration system is established. As part of the initialization process, initial data for the calibration process are provided to the transmitter, at step 502. For example, initial data is loaded to the transmitter DAC, which generates driving signal, accordingly. Initial data include, among other things, transmission signal frequency (e.g., a simple sine wave is used as test signal), amplitude, and phase offset parameters. The initial data provides a starting point for the calibration process, and depending on the specific implementation, the initial data includes parameter values that are typically within the operating range of the transmitter. For example, the phase offset, as included in the initial data, is somewhere close to 90 degrees.

At step 503, the frequency is set at $\omega_i$. As explained above, i number of frequencies are used. At step 504, the gain imbalance is set at $\Delta A_n$, where n number of gain imbalance parameters are used for each frequency $\omega_i$. At step 505, the phase offset is set at $\beta_m$, where m number of phase offset values are used for each $\Delta A_n$. Next, the signal, with the updated gain imbalance and phase offset settings, is loaded into the DAC. As can be seen in FIG. 5 and explained above, iterations of second harmonic measurements are performed as nested loops that sweeps through i frequencies, n amplitude settings (to minimize gain imbalance) and m phase offset values. It is to be appreciated that depending on the implementation, different nesting sequences (e.g., frequency, gain imbalance, and phase offset) can be used. For example, the parameter can be loaded to the transmitter DAC according to the formula below:

$$v_{XID}(t) = A_0 \cos(\omega_1 t)$$

$$v_{XQD}(t) = (A_0 + \Delta A)\sin(\omega_1 t + \beta)$$

At step 506, a second harmonic value is measured. The output of the transmitter, which is an optical output, is converted by the photodetector to an electrical signal that is analyzed and I measured by the spectrum analyzer.

At step 507, the second harmonic value is compared to a minimum value, which is updated during the iterations of measurements. If the measured second harmonic value is less than previously stored minimum value, the minimum value is updated with the newly measured second harmonic value, and gain imbalance and offset parameters of the current iteration associated with the new minimum second harmonic value are stored, at step 508, and the process proceeds to step 509. On the other hand, if the measured second harmonic value is not less than the previously stored minimum value, the minimum value is not updated, and the process goes to step 509.

Step 509 goes back to step 505, and thus repeating steps 506-508 m times. Once m iterations are completed for a given phase offset setting, the process proceeds to step 510, where n gain imbalance parameters are used and their second harmonic value measured, repeating steps 505-509 n times. Once n iterations are completed for a given gain imbalance setting, the process proceeds to step 511, where i frequencies are used, repeating steps 504-510 i times.

After i*n*m measurements (exhausting the combinations of frequencies, gain parameters, and phase offset parameters) at the end of step 511, the gain imbalance and offset parameters associated with the lowest second harmonic value are obtained, at step 512. For example, these parameters are provided as optimal settings for the transmitter.

Depending on the implementation of the calibration process, a reduced number of measurements (compared to the process illustrated in FIG. 5) may be used in alternative calibration processes according to embodiment of the present invention. For example, gain and offset parameters associated with the minimum second harmonic value may be determined independently. More specifically, for a given frequency, n iterations of measurements are performed to determine the gain parameter, and using this gain parameter, m iterations of measurements performed to determine the offset parameter. The sequence of determining the gain parameter and the offset parameter may be reversed; that is, m iterations of measurement are performed to determine an offset parameter associated with the lowest second harmonic value, and using this offset parameter, n iterations of measurements are performed to determine the gain parameter. It is to be appreciated that independent determination of gain and phase offset parameters can significantly reduce the number of measurements needed by a factor of (n*m)/(n+m), where n and m are both greater than or equal to 2.

Figure 6A:
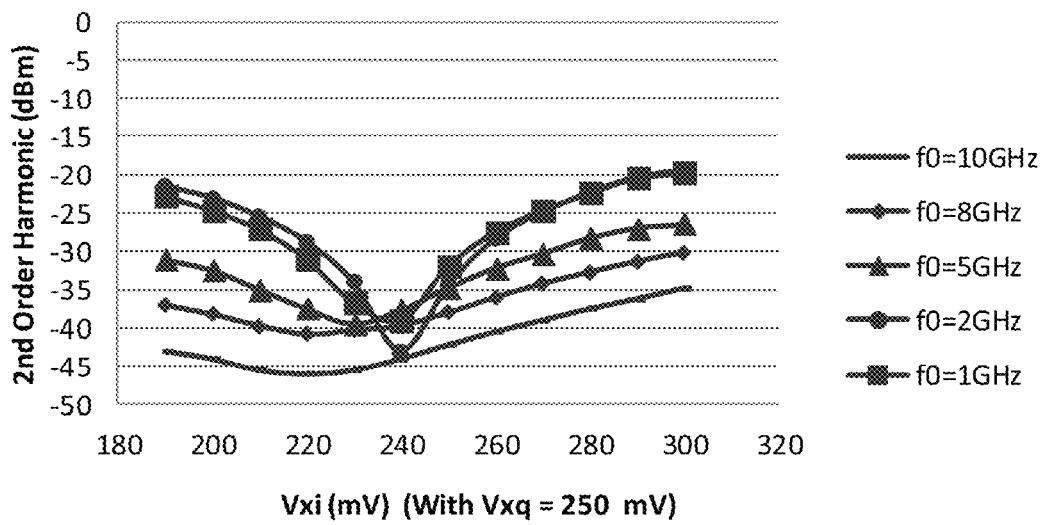
FIGS. 6A and 6B are graphs illustrating measured second harmonic from gain imbalance values in relation to the DAC peak to peak swing of one of the channels.
Figure 6B:
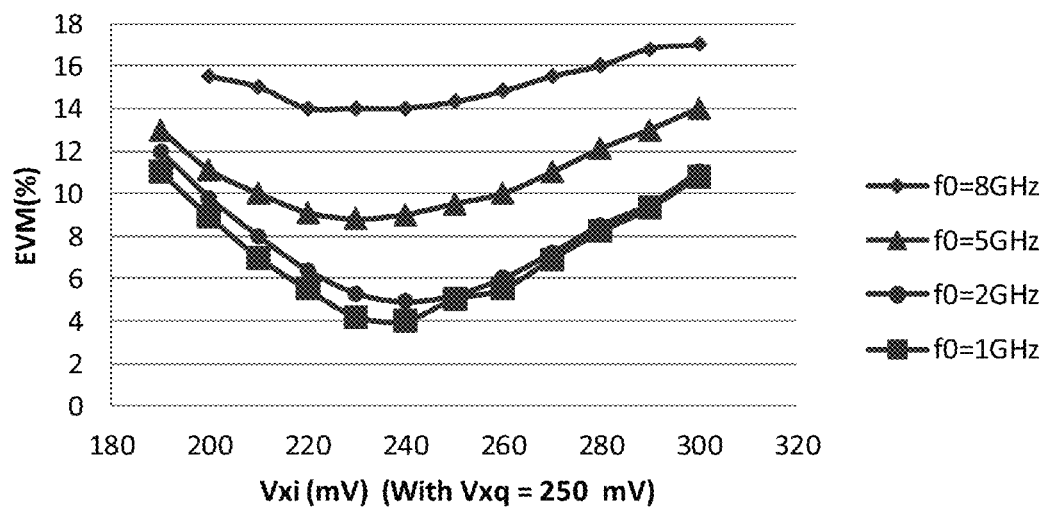

FIGS. 6A and 6B are graphs illustrating measured second harmonic gain imbalance values in relation to the DAC peak to peak swing of one of the channels. For the measurement illustrated in FIGS. 6A and 6B, the swing for the $V_{XQ}$ channel was fixed at 250 mV, and the swing for the $V_{XI}$ channel was varied from 190 mV to 300 mV. The driver gain setting is set at about 10 dB. As shown in FIG. 6A, depending on the frequency, the minimal second harmonic values correspond to different DAC peak-to-peak swing voltages. For example, at 2 GHz, second order harmonic has its minimum at $V_{XI}$ channel setting of about 240 mV DAC swing; at 8 GHz, the second order harmonic has its minimum when $V_{XI}$ channel is set to about 220 mV. The correlation between the magnitude of the second harmonic and the error vector magnitude (EVM) (QPSK modulation at 4× the frequency) can clearly be seen. At frequencies of 1 and 2 GHz, the optimum swing for $V_{XI}$ is 240 mV and decreases to 220 mV at 10 GHz. As can be seen from FIGS. 6A and 6B, the second harmonic measurements correlate very well with the EVM measurements.

Figure 7A:
FIGS. 7A and 7B are graphs illustrating measured second harmonic from skew in relation to the phase difference.
Figure 7B:
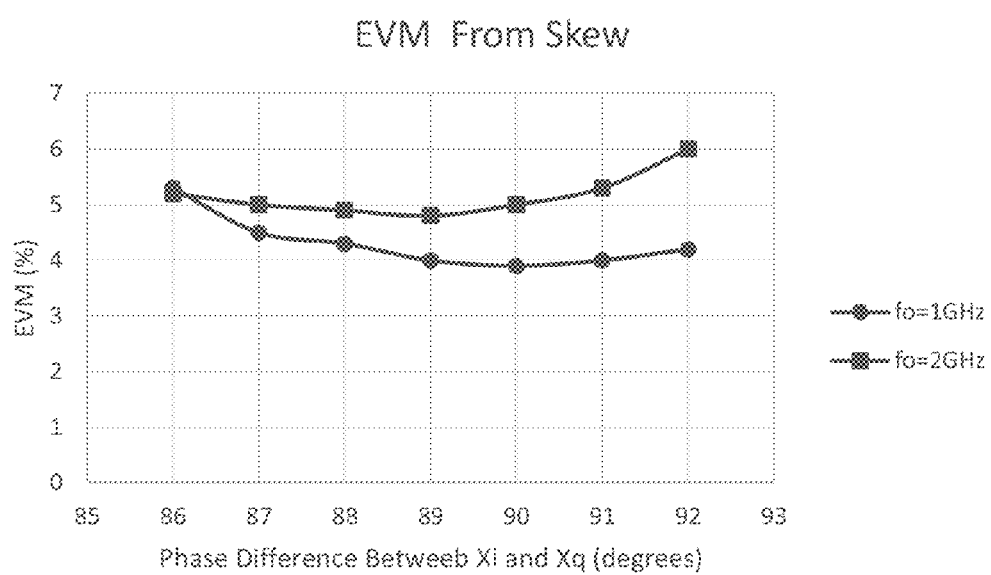

FIGS. 7A and 7B are graphs illustrating measured second harmonic from skew in relation to the phase difference. For QPSK type of data modulation, the offset frequency is typically at about 90 degrees. As can be seen in FIG. 7A, the measured second harmonic is minimized at about 89 degrees phase difference for both 1 GHz and 2 GHz signals. The minimization of the second harmonic measurement corresponds to minimization of EVM, as shown in FIG. 7B. More specifically, for 2 GHz signals, the minimum EVM is at about 89 degrees, although minimum EVM is at about 90 degrees for 1 GHz signal. This difference can be explained by measurements accuracy.

Figure 8A:
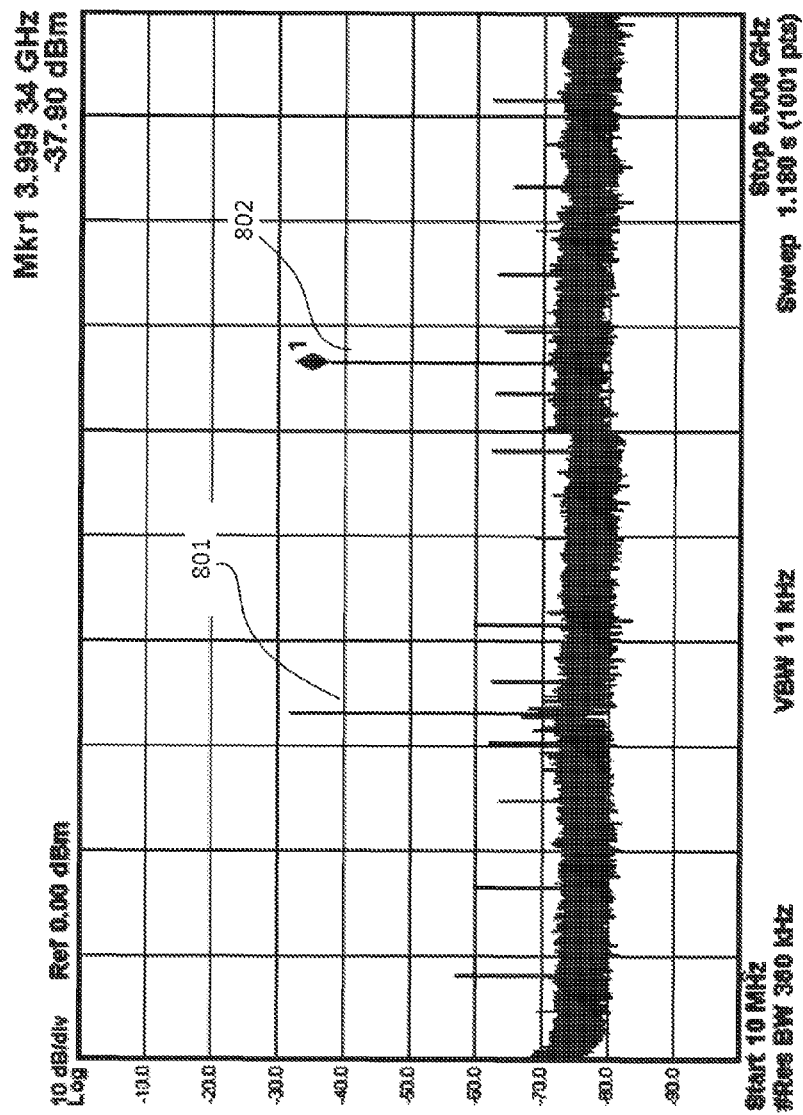
FIGS. 8A and 8B illustrate spectrum analyzer measurements for 2 GHz data signal.
Figure 8B:
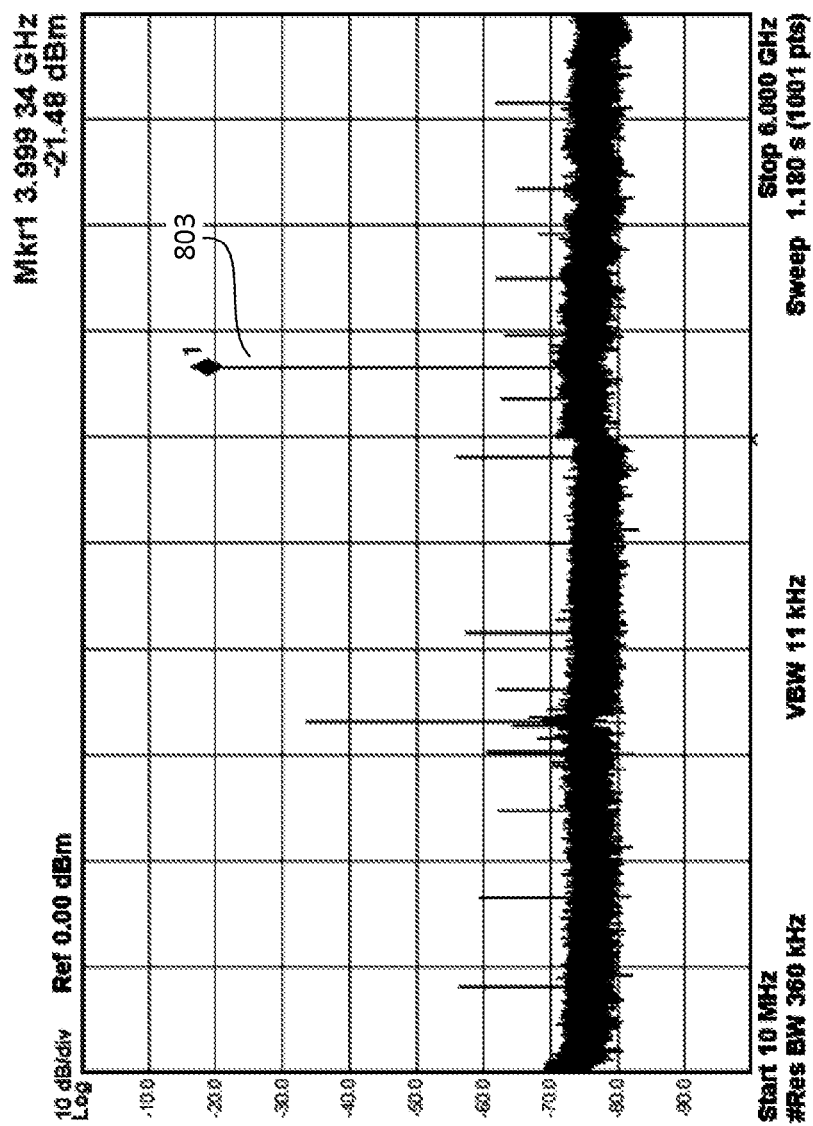

FIGS. 8A and 8B illustrate spectrum analyzer measurements for 2 GHz data signal. As can be seen in FIG. 8A, the amplitude (at point 801) of the fundamental frequency at 2 GHz depends on the bias controller gain output. At the second harmonic, which is at 4 GHz, the amplitude at point 802 corresponds to minimum of the second harmonic. As shown in FIG. 8B, the amplitude of the second harmonic at 4 GHz corresponds to an amplitude difference of about 20 mV from optimum.

Figure 9:
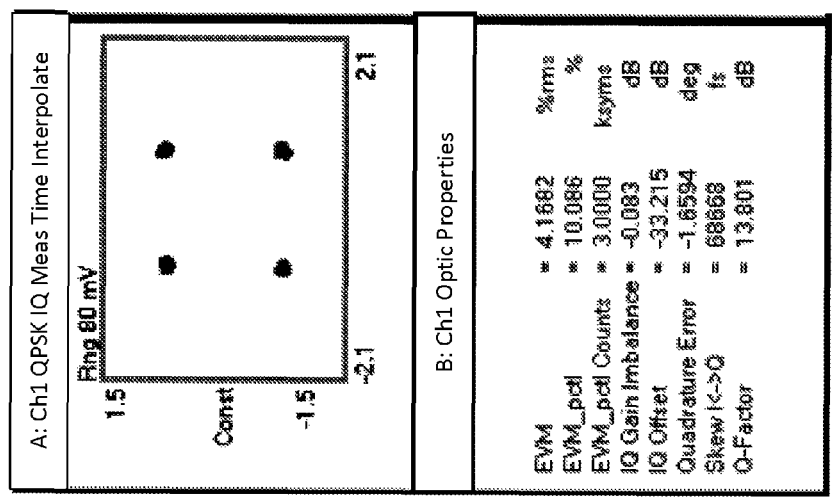
FIG. 9 is a diagram illustrating EVM measurement.

FIG. 9 is a diagram illustrating EVM measurement. In FIG. 9, the EVM measurement is made with the same quadrature signals by demodulating the transmitter output as a QPSK signal at a baud rate of 4 $f_0$.

As illustrated in FIGS. 6-9, actual measurements demonstrate that the second harmonic magnitude correlates, closely, with gain imbalance, skew, and EVM of the transmitter. Thus the second harmonic measurement is clearly a good indicator to use during the calibration process. Once the gain parameter and the phase offset parameter are determined, the transmitter system stores these parameters for later use. It is to be appreciated that the calibration systems according to the present invention can be implemented in various ways. More specifically, gain imbalance compensation can be added to the transmitter output through filters, driver settings, or DAC settings, while phase offset parameter can be added to the transmitter through a filter or a DAC setting. For example, gain imbalance is generally a function of frequency, and a gain correction typically involves a filter. For example, calibration parameters can be integrated with a transmit filter that is implemented at the DSP component of the transmitter. In a specific embodiment, a fixed gain offset is used (i.e., gain offset of the measured gain imbalance based on the second harmonic at a suitable frequency). The fixed gain offset can be applied using the gain settings of the I and Q drivers. Additionally, the skew can be compensated for each of the frequencies with a digital filter. In certain embodiments, a single delay value is implemented digitally to compensate for the system skew and/or phase offset.

In an exemplary embodiment, a frequency dependent gain compensation filter is used. For example, the measured data (e.g., measurement obtained based on the second harmonic measurement) are used to configure a filter for compensating the frequency dependent gain imbalance. Now referring back to FIGS. 6A and 6B. Based on the measurements plotted in FIGS. 6A and 6B of gain imbalance at different frequencies, the following data are obtained:

TABLE 1

| Frequency | Voltage Swing For Vxq (mV) | Voltage Swing For Vxi (mV) | Ratio of Voltage Swings (dB) = Gain Imbalance |
|---|---|---|---|
| 0.00E+00 | 250 | 240 | −0.35 |
| 1.00E+09 | 250 | 240 | −0.35 |
| 2.00E+09 | 250 | 240 | −0.35 |
| 5.00E+09 | 250 | 230 | −0.72 |
| 8.00E+09 | 250 | 225 | −0.92 |
| 1.00E+10 | 250 | 220 | −1.11 |

Figure 10:
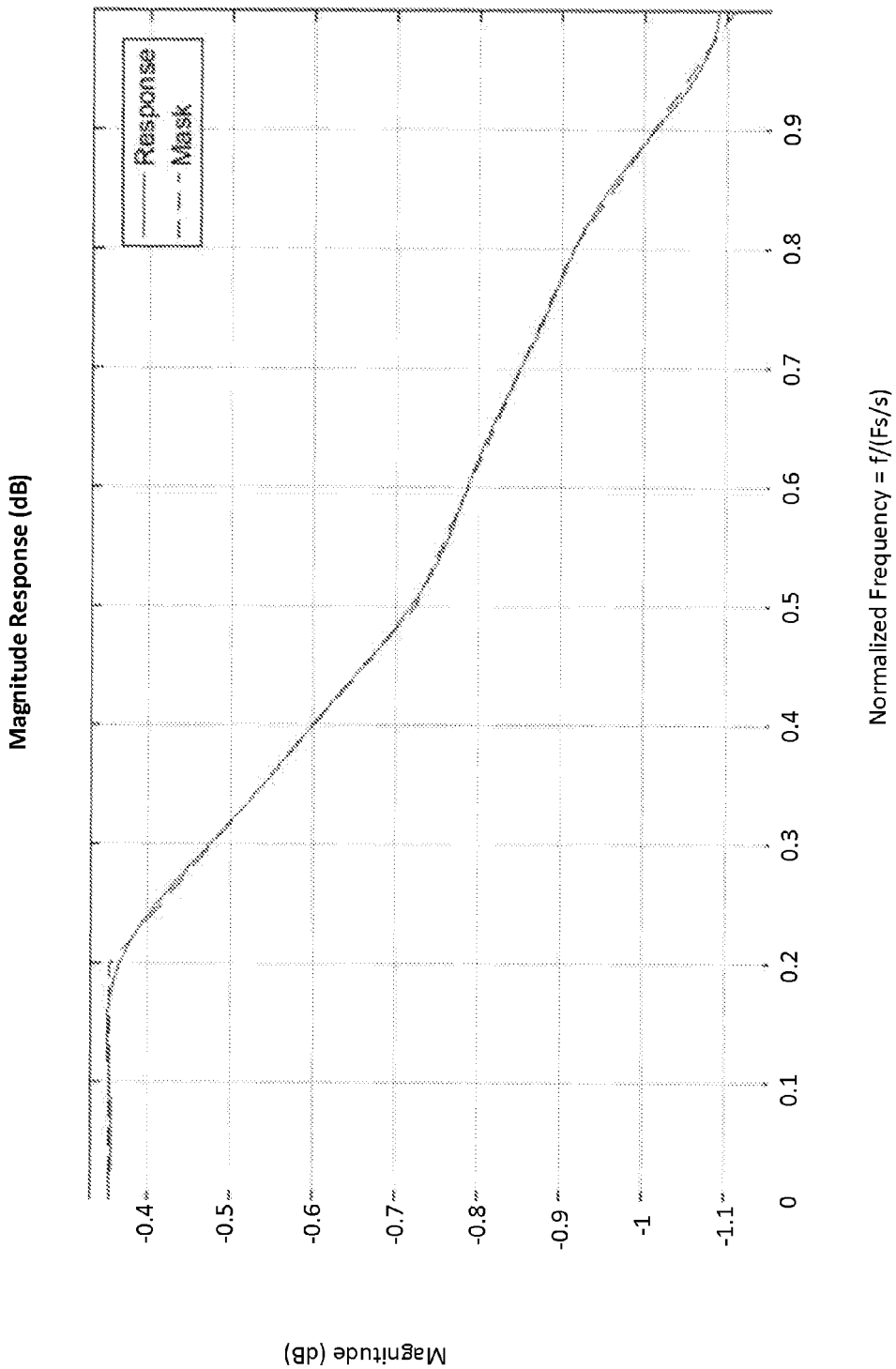
FIG. 10 is a simplified diagram illustrating a low-pass filter for compensating gain imbalance according to an embodiment of the invention.

Based on the data in Table 1, a low-pass filter in the XQ path or a high-pass filter in the XI path can be used to provide the balance needed. FIG. 10 is a simplified diagram illustrating a low-pass filter for compensating gain imbalance according to an embodiment of the invention. For example, the low-pass filter as a cutoff frequency at a normalized value of 0.2. For example, assume a digital filter of order 10 and sample rate of 20 GHz. The magnitude of the resulting filter is shown in FIG. 10.

Figure 11:
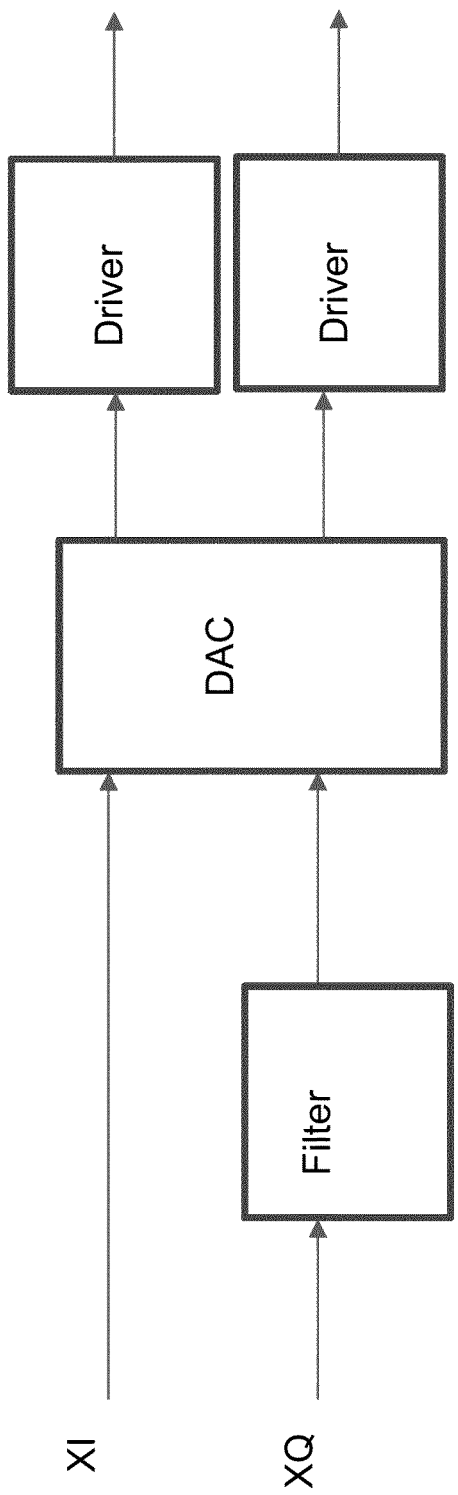
FIG. 11 is a simplified diagram illustrating a low-pass filter implemented on the XQ path according to an embodiment of the present invention.

FIG. 11 is a simplified diagram illustrating a low-pass filter implemented on the XQ path according to an embodiment of the present invention. This diagram is merely an example, which should not unduly limit the scope of the claims. One of ordinary skill in the art would recognize many variations, alternatives, and modifications. For example, the filter can be combined with a pulse shaping filter such as a square root raised cosine filter which is typically used in a coherent system. There are other embodiments as well.

For the calibration techniques according to the present invention, there are certain requirements for the transmitter hardware and the calibration system. Among other things, the photodetector and spectrum analyzer of the calibration system need to be accurate and sensitive enough to detect the signal, the frequency response of both, must be wide enough to detect the signal under test and its second harmonic. The photodetector needs to have low distortion and appropriate wavelength. Additionally, for the second order harmonic measurement to be a useful indication of system performance, driver linearity of the transmitter driver is also important. More specifically, the driver needs to provide enough linearity for the magnitude of the second order harmonic to correspond to the transmitter signal output (e.g., EVM levels). Similarly, the transmitter DAC also needs to provide enough spectral purity for the second order harmonic to be useful in the calibration process.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A system for calibrating an optical transmitter, the system comprising:
a photodetector coupled to the optical transmitter, the photodetector being configured to generate an electrical signal using an optical signal received from the optical transmitter;
a spectrum analyzer coupled to the photodetector, the spectrum analyzer being configured to measure a second harmonic value for the electrical signal received from the photodetector; and
a controller module being configured to provide testing signals and transmitter parameters to the optical transmitter and process the second harmonic value measured by the spectrum analyzer, wherein the controller generates predetermined sets of transmitter parameters to the optical transmitter and determines a set of calibrated parameters based on a set of transmitter parameters associated with a minimum second harmonic value;
wherein:
the optical transmitter operates in a coherent optical transmission system;
the optical transmitter comprises an optical modulator for modulating the optical signal, the optical modulator being coupled to a bias controller;
the spectrum analyzer is configured to measure the optical signal independent of the bias settings of the bias controller.

2. The system of claim 1 wherein the set of calibrated parameters comprises a gain parameter and a phase offset parameter.

3. The system of claim 1 wherein the optical transmitter comprises a coherent transmitter.

4. The system of claim 1 wherein the optical signal is in an nQAM format.

5. The system of claim 1 wherein the controller comprises a memory for storing the predetermined sets of transmitter parameters.

6. The system of claim 1 wherein the optical transmitter comprises a DAC for generating the predetermined sets of transmitter signals based on predetermined and/or calibrated parameters.

7. The system of claim 1 wherein the optical signal comprises four modulated signals.

8. The system of claim 1 wherein the transmitter comprises an MZ modulator, the MZ modulator being configured to perform optical modulation using gain bias and phase offset information based on the set of calibrated parameters.

9. The system of claim 1 wherein the second harmonic value is associated with gain imbalance and skew of the optical signal.

10. The system of claim 6 wherein the DAC generates gain and phase offset signals based on the set of calibrated parameters.

11. A system for calibrating an optical transmitter, the system comprising:
a photodetector coupled to the optical transmitter, the photodetector being configured to generate an electrical signal using an optical signal received from the optical transmitter;
a spectrum analyzer coupled to the photodetector, the spectrum analyzer being configured to determine a second harmonic value for the electrical signal received from the photodetector; and a controller module being configured to provide testing signals and transmitter parameters to the optical transmitter and process the second harmonic value determined by the spectrum analyzer, wherein the controller generates predetermined sets of transmitter parameters to the optical transmitter and determine a set of calibrated parameters based on a set of transmitter parameters associated with a minimum second harmonic value, the set of calibrated parameters comprises a gain parameter and an offset parameter, the set of calibrated parameters being stored by the optical transmitter;

wherein:

the optical transmitter operates in a coherent optical transmission system;

the optical transmitter comprises an optical modulator for modulating the optical signal, the optical modulator being coupled to a bias controller;

the spectrum analyzer is configured to measure the optical signal independent of the bias settings of the bias controller.

12. The system of claim 11 wherein the predetermined set of transmitter parameters comprises a set of gain parameters and a set of phase offset parameters.

13. The system of claim 11 wherein the predetermined set of transmitter parameters are associated with a plurality of transmitter frequencies.

14. A method for calibrating transmitter parameters, the method comprising:

coupling an optical transmitter to a calibration system, the calibration system comprising a photodetector, a spectrum analyzer, and a controller;

retrieving a set of calibration parameter from the controller, the calibration parameter comprising a set of initial parameters;

providing the set of initial parameters to the optical transmitter;

generating an initial optical signal by the optical transmitter based on the set of initial parameters;

converting the initial optical signal to an initial electrical signal using the photodetector;

determining a second harmonic value based on the initial electrical signal using the spectrum analyzer;

generating calibrated optical signals using the set of calibration parameters by the optical transmitter;

determining a set of calibrated parameters from the set of calibration parameters based on a minimum second harmonic value; and storing the set of calibrated parameters by the optical transmitter;

wherein:

the optical transmitter operates in a coherent optical transmission system;

the optical transmitter comprises an optical modulator for modulating the optical signal, the optical modulator being coupled to a bias controller;

the spectrum analyzer is configured to measure the optical signal independent of the bias settings of the bias controller.

15. The method of claim 14 wherein the set of calibration parameter comprises i number of frequencies, n number of gain values, and m number of phase offset values.

16. The method of claim 14 further comprising updating comprising the second harmonic value with measured second harmonic value associated with calibration parameters.

17. The method of claim 14 further comprising:

measuring the second harmonic value at least m times using different phase offset parameters;

measuring the second harmonic value at least n times using different gain parameters; and measuring the second harmonic value at least i times using different frequencies.

18. The method of claim 14 further comprising generating a reference sinewave signal for performing calibration.

19. The method of claim 15 where the optical transmitter generates calibration optical signals for i*n*m iterations.

20. The method of claim 15 where the optical transmitter generates calibration optical signals i*(n+m) times.

* * * * *